(12) United States Patent
Derbanne et al.

(10) Patent No.: US 12,506,962 B1
(45) Date of Patent: Dec. 23, 2025

(54) CONSTRAINT MODEL SPACE PARTITION TREE FOR VIDEO STABILIZATION

(71) Applicant: GoPro, Inc., San Mateo, CA (US)

(72) Inventors: Thomas Derbanne, Paris (FR); Nicolas Rahmouni, Paris (FR); Luis Mario Domenzain, Paris (FR)

(73) Assignee: GoPro, Inc., San Mateo, CA (US)

( * ) Notice: Subject to any disclaimer, the term of this patent is extended or adjusted under 35 U.S.C. 154(b) by 192 days.

(21) Appl. No.: 18/413,566

(22) Filed: Jan. 16, 2024

(51) Int. Cl.
*G06T 3/147* (2024.01)
*H04N 23/68* (2023.01)

(52) U.S. Cl.
CPC ......... *H04N 23/6842* (2023.01); *G06T 3/147* (2024.01); *H04N 23/683* (2023.01)

(58) Field of Classification Search
CPC ... H04N 23/683; H04N 23/6842; G06T 3/147
USPC ........................................................ 375/240
See application file for complete search history.

(56) References Cited

U.S. PATENT DOCUMENTS

| 2013/0286239 | A1* | 10/2013 | Lupher | .............. | H04N 23/6845 348/222.1 |
| 2015/0256755 | A1* | 9/2015 | Wu | ...................... | H04N 23/681 348/208.6 |

* cited by examiner

*Primary Examiner* — Dominic D Saltarelli
(74) *Attorney, Agent, or Firm* — Esplin & Associates, PC (57) ABSTRACT

A constraint model may include a representation of feasible viewing window placement within the field of view of a video for stabilization. When the viewing window extends beyond the field of view of the video, the placement of the viewing window may be modified using a constraint model space partition tree. The constraint model space partition tree may include branches that split the constraint model and enable use of greater number of stabilization parameters to stabilize the video.

20 Claims, 5 Drawing Sheets

CONSTRAINT MODEL SPACE PARTITION TREE FOR VIDEO STABILIZATION

FIELD

This disclosure relates to stabilizing videos using a constraint model space partition tree.

BACKGROUND

A video may be stabilized to provide a smoother/less jerky view of the captured scene. The video may be stabilized by extracting spatial portions of the video within a viewing window to generate the stabilized videos. A constraint model may define all possible placements of the viewing window within the video. The dimensions of the constraint model may increase with the increase in the number of stabilization parameters for the video. The increase in the dimensions of the constraint model may make use of the constraint model too costly or infeasible.

SUMMARY

This disclosure relates to stabilizing videos. Video information, viewing window placement information, constraint model space partition tree information, and/or other information may be obtained. The video information may define a video. The video may include visual content having a progress length. The visual content may have a source field of view. The viewing window placement information for the video may define placement of a viewing window for the visual content as the function of progress through the progress length. The viewing window may define extents of the visual content to be included within stabilized visual content as the function of progress through the progress length. The viewing window may have a punchout field of view. The constraint model space partition tree information for the video may define a constraint model space partition tree for the video. The constraint model space partition tree may include branches that split a constraint model for the video. The constraint model for the video may include a representation of feasible viewing window placement in which entirety of the punchout field of view of the viewing window is contained within the source field of view of the visual content.

Responsive to the placement of the viewing window outside the source field of view of the visual content, modified placement of the viewing window may be determined based on the constraint model space partition tree for the video and/or other information. The stabilized visual content may be generated based on the modified placement of the viewing window and/or other information. The stabilized visual content may include a punchout of the extents of the visual content defined by the viewing window. Inclusion of the extents of the visual content defined by the viewing window within the stabilized visual content may effectuate stabilization of the visual content.

A system for stabilizing videos may include one or more electronic storage, processor, and/or other components. The electronic storage may store video information, information relating to a video, information relating to visual content, viewing window placement information, information relating to a viewing window, information relating to placement of the viewing window, constraint model space partition tree information, information relating to a constraint model space partition tree, information relating to a constraint model, information relating to modified placement of the viewing window, information relating to stabilized visual content, and/or other information.

The processor(s) may be configured by machine-readable instructions. Executing the machine-readable instructions may cause the processor(s) to facilitate stabilizing videos. The machine-readable instructions may include one or more computer program components. The computer program components may include one or more of a video component, a placement component, a constraint model component, a modified placement component, a generation component, and/or other computer program components.

The video component may be configured to obtain video information and/or other information. The video information may define a video. The video may have a progress length. The video may include visual content having the progress length. The visual content may have a source field of view.

The placement component may be configured to obtain viewing window placement information for the video and/or other information. The viewing window placement information may define placement of a viewing window for the visual content as the function of progress through the progress length of the video. The viewing window may define extents of the visual content to be included within stabilized visual content as the function of progress through the progress length of the video. The viewing window may have a punchout field of view.

The constraint model component may be configured to obtain constraint model space partition tree information for the video and/or other information. The constraint model space partition tree information may define a constraint model space partition tree for the video. The constraint model space partition tree may include branches that split a constraint model for the video. The constraint model for the video may include a representation of feasible viewing window placement in which entirety of the punchout field of view of the viewing window is contained within the source field of view of the visual content.

In some implementations, the representation of feasible viewing window placement of the constraint model may be generated based on multiple stabilization parameters for the video and/or other information. The multiple stabilization parameters for the video may include rotations about multiple axes. The multiple stabilization parameters for the video may further include a size or a shape of the viewing window. The multiple stabilization parameters for the video may further include a reduction in usable extent of the source field of view of the visual content for the placement of the viewing window.

In some implementations, the constraint model space partition tree may include a k-D tree or a binary space partitioning tree.

In some implementations, the branches of the constraint model space partition tree may terminate at leaves of the constraint model space partition tree. An individual leaf of the constraint model space partition tree may define a projection function to move the viewing window outside the source field of view of the visual content to inside the source field of view of the visual content. The individual leaf of the constraint model space partition tree may define a single projection function for a group of neighboring points inside the constraint model for the video. The projection function may include an affine transformation.

The modified placement component may be configured to, responsive to the placement of the viewing window outside the source field of view of the visual content, determine modified placement of the viewing window based on the constraint model space partition tree for the video and/or other information.

The generation component may be configured to generate the stabilized visual content based on the modified placement of the viewing window and/or other information. The stabilized visual content may include a punchout of the extents of the visual content defined by the viewing window. Inclusion of the extents of the visual content defined by the viewing window within the stabilized visual content may effectuate stabilization of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
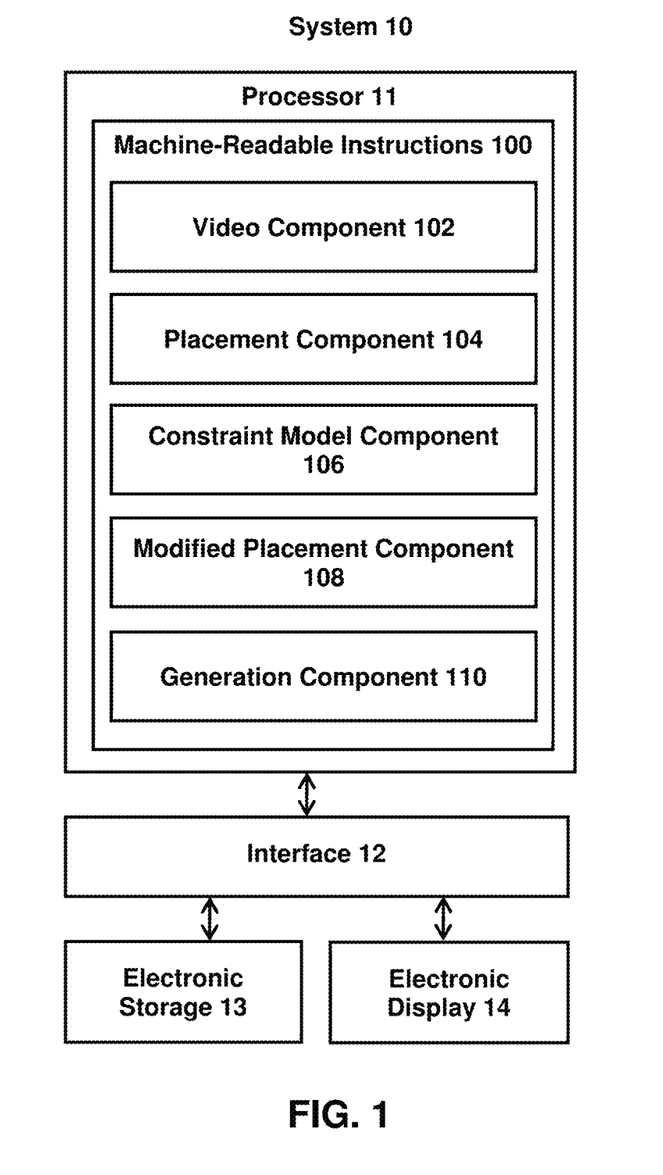
FIG. 1 illustrates an example system for stabilizing videos.

FIG. 1 illustrates a system 10 for stabilizing videos. The system 10 may include one or more of a processor 11, an interface 12 (e.g., bus, wireless interface), an electronic storage 13, an electronic display 14, and/or other components. Video information, viewing window placement information, constraint model space partition tree information, and/or other information may be obtained by the processor 11. The video information may define a video. The video may include visual content having a progress length. The visual content may have a source field of view. The viewing window placement information for the video may define placement of a viewing window for the visual content as the function of progress through the progress length. The viewing window may define extents of the visual content to be included within stabilized visual content as the function of progress through the progress length. The viewing window may have a punchout field of view. The constraint model space partition tree information for the video may define a constraint model space partition tree for the video. The constraint model space partition tree may include branches that split a constraint model for the video. The constraint model for the video may include a representation of feasible viewing window placement in which entirety of the punchout field of view of the viewing window is contained within the source field of view of the visual content.

Responsive to the placement of the viewing window outside the source field of view of the visual content, modified placement of the viewing window may be determined by the processor 11 based on the constraint model space partition tree for the video and/or other information. The stabilized visual content may be generated by the processor 11 based on the modified placement of the viewing window and/or other information. The stabilized visual content may include a punchout of the extents of the visual content defined by the viewing window. Inclusion of the extents of the visual content defined by the viewing window within the stabilized visual content may effectuate stabilization of the visual content.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, viewing window placement information, information relating to a viewing window, information relating to placement of the viewing window, constraint model space partition tree information, information relating to a constraint model space partition tree, information relating to a constraint model, information relating to modified placement of the viewing window, information relating to stabilized visual content, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to a video, information relating to visual content, viewing window placement information, information relating to a viewing window, information relating to placement of the viewing window, constraint model space partition tree information, information relating to a constraint model space partition tree, information relating to a constraint model, information relating to modified placement of the viewing window, information relating to stabilized visual content, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors. References to the housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

The visual content captured by the image capture device may be stabilized and/or otherwise modified. Stabilization of the visual content may include horizon leveling of the visual content. The visual content may be stabilized based on the positions and/or motions of the image capture device during visual content capture. Information that characterizes the positions and/or motions of the image capture device may be used to offset/counter shaking and/or tilt of the image capture device during visual content capture.

Stabilization of visual content may refer to modifying or punching out a portion of the visual content to depict a stabilized scene. Stabilization of visual content may refer to modifying or punching out a portion of the visual content so that the scene depicted within the visual content appears more stable than in the original visual content. Stabilization of visual content may include reduction/removal of motion present in the visual content due to motion (e.g., mechanical displacement, rotational motion, translational motion) of the image capture device during visual content capture.

Horizon leveling of visual content may refer to modifying or punching out a portion of the visual content to depict a leveled scene. Horizon leveling of visual content may refer to modifying or punching out a portion of the visual content so that the scene depicted within the visual content is leveled with respect to ground, sea, earth, and/or the horizon. Horizon leveling of visual content may refer to modifying or punching out a portion of the visual content so that the depicted scene appears to have been captured by an upright image capture device (non-tilted image capture device).

The visual content captured by the image capture device may be stabilized and/or leveled as a function of progress through the progress length of the visual content based on the rotational positions of the image capture device as the function of progress through the capture duration and/or other information. The visual content captured by the image captured device may be rotated to compensate for rotation of the image capture device during the capture duration such that a view of the visual content includes depiction of stabilized and/or leveled scene. For example, readings from the position/motion sensor of the image capture device may be used to determine how the image capture device moved during the capture duration and the direction and amount of image capture device movement may be used to determine which portions of the visual content should be punched out to stabilize the visual content. Readings from the position/motion sensor of the image capture device may be used to determine the direction of gravity when visual content is captured at different moments within the capture duration. The direction of gravity may be used to determine the amount of rotation that needs to be applied to the visual content to level the depiction within the visual content. For instance, the visual content may be rotated so that the direction of gravity is pointed downwards or the viewing window may be rotated so that the direction of gravity within the viewing window is pointed downwards.

Stabilization and/or horizon leveling of the visual content may be performed based on placement of a viewing window within the field of view of the visual content. A viewing window may define extents of the visual content (e.g., of image(s)/video frame(s)) to be included within a punchout. The viewing window placement may be determined so that the visual content within the viewing window does not include or includes less motion (e.g., less shaking) than the original visual content. The viewing window placement may be determined so that the visual content within the viewing window does not include tilt or includes less tilt from horizon than the original visual content.

The placement of the viewing window may compensate for the movement (shaking) and/or the rotation (tilt) of the image capture device during the capture duration. For example, a viewing window having a smaller size than the field of view of the visual content may be used to provide a punchout of the visual content. A punchout of the visual content may refer to an output of one or more portions of the visual content for presentation (e.g., current presentation, future presentation based on a video generated using the punchout). A punchout of the visual content may refer to extents of the visual content that is obtained for viewing and/or extraction. The extents of the visual content viewable/extracted within the viewing window may be used to provide views of different spatial portions of the visual content. The placement of the punchout may be moved within the field of view to provide a stabilized view of the visual content. The punchout (cropped view) may be rotated within the field of view to provide a horizon-leveled view of the visual content.

Figure 3:
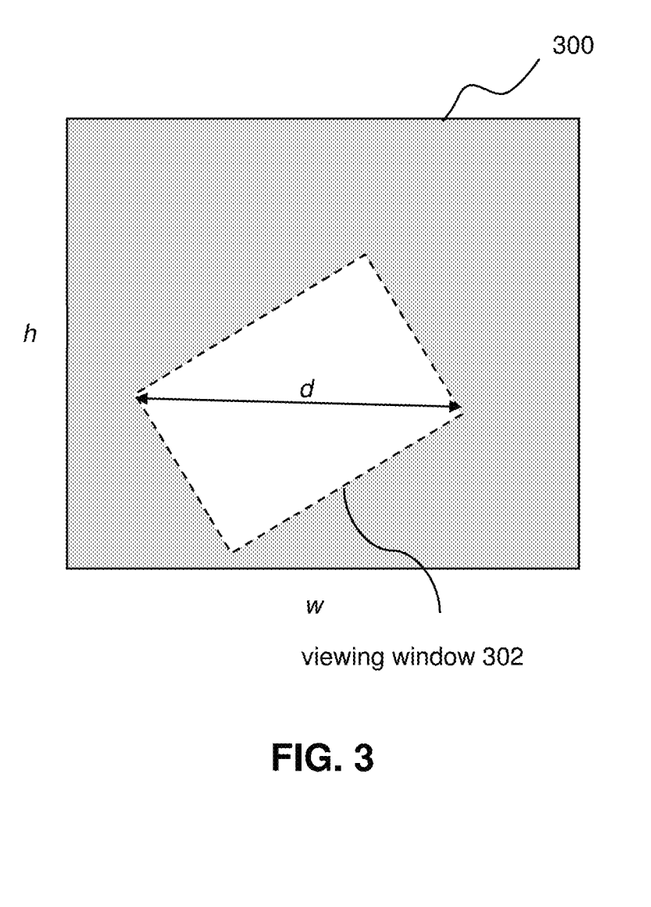
FIG. 3 illustrates an example viewing window placement for an image.

FIG. 3 illustrates an example viewing window placement for an image 300. The image 300 may be captured by an image capture device experiencing motion (e.g., shaking). For example, the image capture device may not be steady when capturing the image 300 and other (preceding, following) images. Such movement of the image capture device may result in the visual content including a shaky depiction of the scene. Viewing the image 300 and other images (as video frames of a video) may show movement (e.g., shaking) in the depicted scene moving. The image 300 may be captured by an image capture device that is rotated with respect to ground. For example, the image 300 may be captured by the image capture device rotated to the right to capture the image 300. Such rotation of the image capture device may result in the visual content including tilted depiction of the scene. Viewing the image 300 may show upright objects within the scene to be depicted as being tilted.

A stabilized and/or horizon-leveled view of the image 300 may be generated by using a viewing window 302. The viewing window 302 may define an extent of the image 300 to be used in generating the stabilized and/or horizon-leveled view of the image 300. The portion of the image 300 within the viewing window 302 may be used in generating the stabilized and/or horizon-leveled view of the image 300.

The image 300 and the viewing window 302 may have different fields of view. The field of view of the viewing window 302 (e.g., diagonal dimension (d)) may be smaller than the field of view of the image 300 (e.g., diagonal of the image 300 having a vertical dimension (h) and the horizontal dimension (w)). Other fields of view and other shapes/dimensions of fields of view are contented.

The placement of the viewing window within the field of view of the visual content may be determined to compensate for motion and/or tilt of the image capture device during capture of visual content. The placement of the viewing window may refer to orientation of the viewing window with respect to the field of view of the visual content. The placement of the viewing window may refer to how the viewing window is positioned within the field of view of the visual content. The placement of the viewing window may be defined by one or more of rotation, location, shape, size, and/or other characteristics of the viewing window. For example, the placement of the viewing window may be defined by where the center of the viewing window is located within the field of view of the visual content and how (in what direction and by what amount) the viewing window is rotated. The viewing window may be used to provide a punchout of the visual content, and the punchout may be rotated and moved within the field of view of the visual content to provide a stabilized and/or horizon-leveled view of the visual content.

A constraint model may be used to control placement of the viewing window for the visual content. A constraint model may refer to a model that places/defines limitation(s) and/or restriction(s) on placement of the viewing window for the visual content. A constraint model may restrict/limit how and/or where the viewing window may be placed with respect to the field of view of the visual content.

A constraint model may include a representation of feasible viewing window placement for the visual content. Feasible viewing window placement for the visual content may refer to placement of viewing window that keeps the entirety of the viewing window within the visual content. Feasible viewing window placement for the visual content may refer to placement of viewing window that keeps field of view of the viewing window (punchout field of view) contained within the field of view of the visual content (source field of view). A viewing window placement that is within (e.g., on the surface of, within the volume of) the representation may be a feasible viewing window placement. When a viewing window is placed outside the field of view of the visual content, the constraint model may be used to project the viewing window into placement so that the viewing window is within the field of view of the visual content. For example, the constraint model may be used to project the viewing window into the closest acceptable placement.

Figure 4:
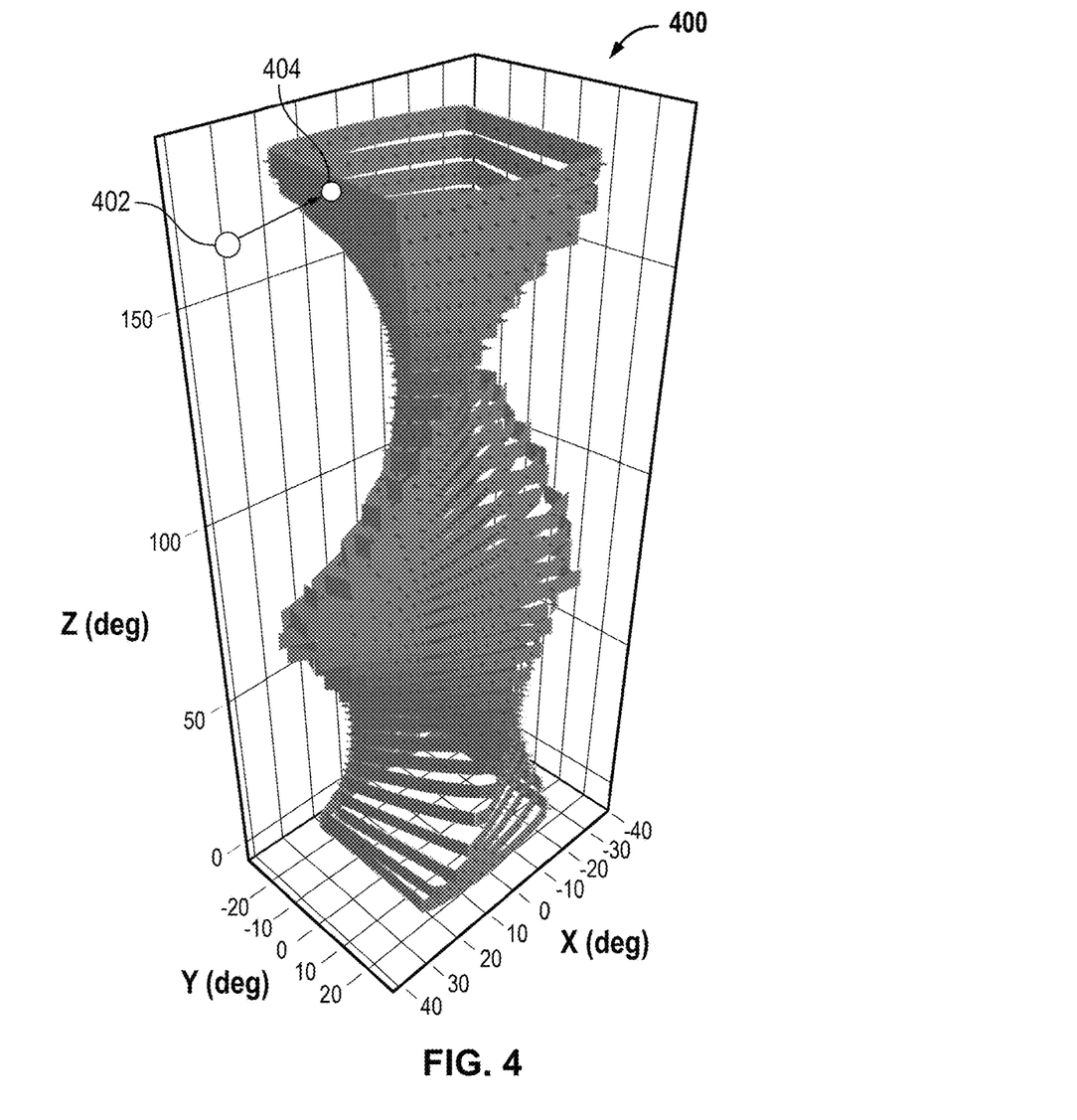
FIG. 4 illustrates an example projection to a surface of a constraint model.

FIG. 4 illustrates an example constraint model 400. Placement of a viewing window may be originally located at a point 402 outside the constraint model 400. The viewing window placement at the point 402 may be determined for a particular moment in a video (for a particular video frame) to apply stabilization and/or horizon leveling to the video. Such placement of the viewing window may result in the viewing window extending beyond the source field of view of the visual content. The viewing window placement may be projected from the point 402 to a point 404 on the surface of the constraint model 400. The point 404 may be a point of the constraint model 400 that is closest to the point 402 (e.g., while being on the same Z-plane (same roll angle)). The modified placement of the viewing window may result in the viewing window being located entirely within the source field of view of the visual content.

Figure 5:
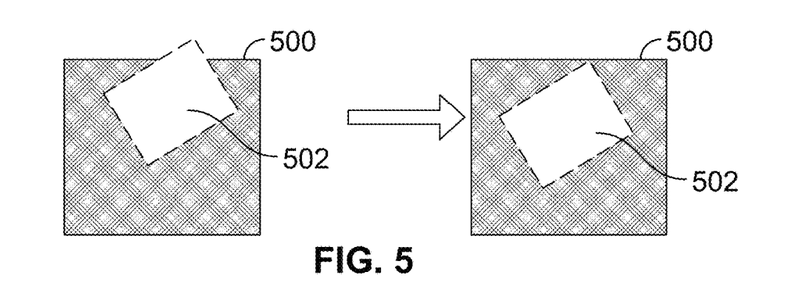
FIG. 5 illustrates an example change in placement of a viewing window.

FIG. 5 illustrates an example change in placement of a viewing window 502. The original viewing window placement may result in the viewing window 502 extending beyond the field of view of an image 500 (e.g., a video frame). A modified placement of the viewing window 502 may be determined using a constraint model. The modified placement of the viewing window 502 may result in the viewing window 502 being fully contained within the image 500. While FIG. 5 shows movement of the viewing window 502 with respect to the image 500, this is merely as an example and is not meant to be limiting. For example, the image (visual content) may be moved with respect to the viewing window to position the viewing window at the determined placement.

The dimensions of the constraint model may correspond to the number of stabilization parameters used to stabilize the visual content. A stabilization parameter may refer to a parameter that controls, sets, affects, characterizes, modifies, and/or otherwise defines how stabilization is performed. A stabilization parameter may be static or dynamic. The dimensions of the constraint model may increase with the increase in the number of stabilization parameters for the video. For example, visual content may be stabilized via the use of rotations about multiple axes for viewing window placement. For example, visual content may be stabilized via the use of rotations about yaw, pitch, and roll axes for viewing window placement. Use of three stabilization parameters for the video may result in a three-dimensional constraint model for the video.

With the addition of more stabilization parameters, the dimensions of the constraint model may increase. For example, additional stabilization parameter(s) for the video may include the size and/or the shape of the viewing window. Different sizes of viewing window may result in different zooming effects within the stabilized video. Different shapes of the viewing window may result in different distortion within the stabilized video. Addition of the zoom/ distortion parameter may increase the dimensions of the constraint model by one. As another example, additional stabilization parameter(s) for the video may include a reduction in usable extent of the source field of view of the visual content for the placement of the viewing window. That is, rather than allowing the entire source field of view to be available for viewing window placement, the viewing window may be required to be placed within a part of the source field of view. For instance, referring to FIG. 3, the useable part of the source field of view may be defined by a vertical top and a vertical bottom along the vertical dimension (h). Addition of the vertical top parameter and the vertical bottom parameter may increase the dimensions of the constraint model by two. Addition of the zoom/distortion parameter, the vertical top parameter, and the vertical bottom parameter may increase the dimensions of the constraint model by three (e.g., from three dimensions to six dimensions). Other stabilization parameters are contemplated.

The constraint model may be queried using an array structure. The array structure may define values of information (data points) contained within the constraint model. Use of the array structure may enable fast access of the information contained within the constraint model. However, as the dimensions of the constraint model increase, the size of the array may increase to the point that makes the use of the array too costly or infeasible. For example, if there are one hundred data points per dimension, the array may need to define one million data points for a three-dimensional constraint model. If the constraint model expands to six dimensions, the array may need to define a trillion data points. The need for additional granularity in dimensions may make the array even larger. Such size of the array may make it difficult to store and access. Such size of the array may make querying the constraint model (checking individual data points defined by the array) costly in terms of computational power and time.

The present disclosure facilitates usage of a constraint model to stabilize video via a constraint model space partition tree. The constraint model space partition tree may split the constraint model (representation of feasible viewing window placement, surface of the constraint model) into smaller zones/subregions. Rather than checking individual data points in an array that defines the constraint model, the constraint model may be queried by using the constraint model space partition tree. The constraint model space partition tree may include a k-D tree, a binary space partitioning tree, and/or other types of space partition tree.

The constraint model space partition tree may be traversed and at individual splits, a check may be made on which side of the split includes the desired viewing window placement. Rather than having to check numerous data points defined by the array (e.g., a billion checks on individual data points), the splits in the constraint model space partition tree may be used to efficiently access the constraint model (e.g., about thirty splits to arrive at the data point for viewing window projection). The constraint model space partition tree may enable use of greater number of stabilization parameters to stabilize the video.

Figure 6:
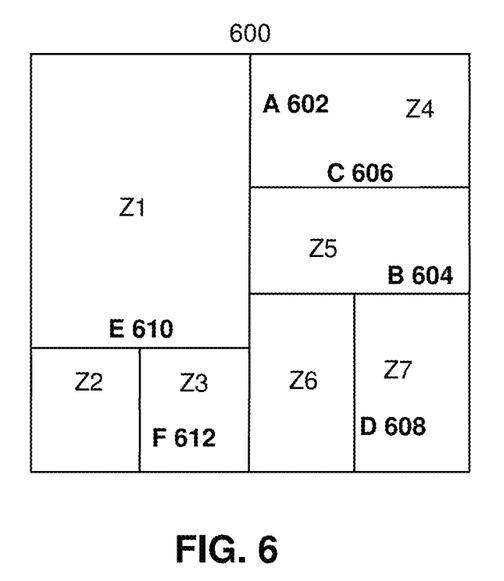
FIG. 6 illustrates an example splitting of a surface into zones.

FIG. 6 illustrates an example splitting of a surface 600 into zones. Splits 602, 604, 606, 608, 610 may be made within the surface 600 to divide the surface into smaller zones/subregions (Z1, Z2, Z3, Z4, Z5, Z6, Z7). While the splits in FIG. 6 are shown to be horizontal and vertical, this is merely as examples and is not meant to be limiting. Other types of splits are contemplated. In some implementations, a constraint model may be split based on distribution of data points within the constraint model. For example, individual splits may divide the split area into zones/subregions containing the same/similar number of data points. The surface 600 may be successively split into zones/subregions that define a single projection function for a group of neighboring points inside the constraint model.

Figure 7:
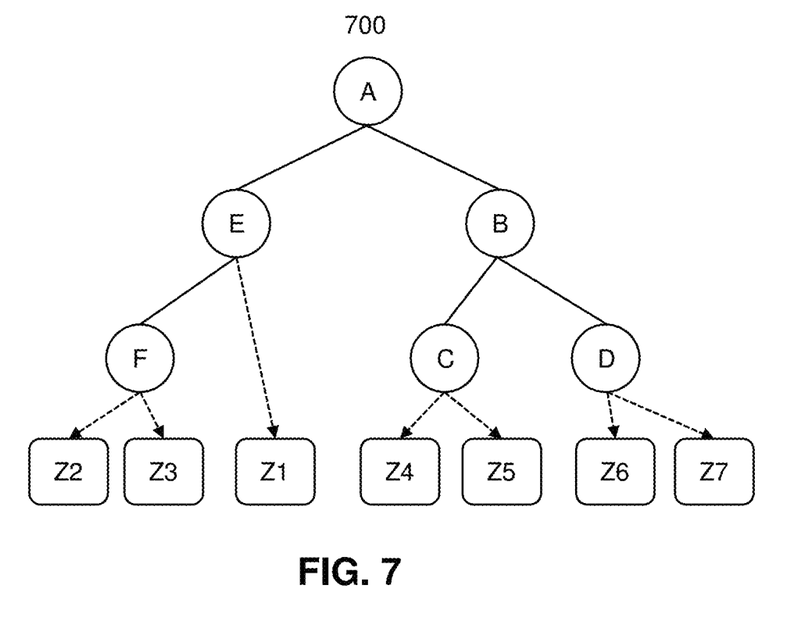
FIG. 7 illustrates an example splitting of a surface into zones.

FIG. 7 illustrates an example splitting of a surface into zones. The splits shown in FIG. 7 may correspond to the splits shown in FIG. 6. A constraint model space partition tree 700 may include branches that split a constraint model for the video. The branches of the constraint model space partition tree 700 may terminate at leaves of the constraint model space partition tree (e.g., Z1, Z2, Z3, Z4, Z5, Z6, Z7). Individual leaves of the constraint model space partition tree 700 may define a projection function (e.g., an affine transformation) to move the viewing window outside the source field of view of the visual content to inside the source field of view of the visual content. The individual leaves of the constraint model space partition tree 700 may define a single projection function for a group of neighboring points inside the constraint model for the video.

The constraint model space partition tree may be generated by taking advantage of smoothness in the constraint model. The constraint model may be piece-wise smooth in that projection of two close queries result in close projections. Locally, the projection function of the constraint model may be defined as an affine transformation. For example, in the neighborhood of a point $x_{ref}$, the projection function may be defined as for $x \in V(x_{ref})$, $CM(x)=Ax+B$, where A and B are matrices. Locally, the projection function may be defined as a plane. Numerous data points of the constraint model may be replaced with parameters A and B.

The constraint model space partition tree may enable targeted query of the constraint model to determine modified viewing window placement that places the viewing window entirely within the source field of view of the visual content. Rather than checking all data points of the constrain model, the constraint model space partition tree may be traversed in the direction of the final modified viewing window placement. At a split of the constraint model space partition tree, a check may be made on which side of the split the projection for modified viewing window placement is included. The query may continue along the branch that contains the desired viewing window placement and the other branch may be ignored. When the query reaches the end of the constraint model space partition tree (final zone/subregion, leaf), the projection function of the end of the constraint model space partition tree may be used to modify the viewing window placement. The projection function of the end of the constraint model space partition tree may be stored for use in modification of the viewing window placement. For example, the matrices A and B of the leaf reached through the query on the constraint model space partition tree may be stored and/or used (e.g., multiply x in the query by the A matrix and add the B matrix) to project the viewing window into a modified placement that places the viewing window entirely within the source field of view of the visual content.

The processor 11 (or one or more components of the processor 11) may be configured to obtain information to facilitate presenting videos. Obtaining information may include one or more of accessing, acquiring, analyzing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a video component 102, a placement component 104, a constraint model component 106, a modified placement component 108, a generation component 110, and/or other computer program components.

The video component 102 may be configured to obtain video information and/or other information. The video component 102 may obtain video information defining a video while an image capture device is capturing the video. The video component 102 may obtain video information defining a video after the video has been captured and stored in memory (e.g., the electronic storage 13). In some implementations, the video information component 102 may obtain video information based on user interaction with a user interface/application (e.g., video editing application, video player application), and/or other information. For example, a user interface/application may provide option(s) for a user to play, edit, stabilize, and/or otherwise consume videos. The video information for a video may be obtained based on the user's selection of the video through the user interface/video application. Other selections of a video for retrieval of video information are contemplated.

The video information may define a video. A video may have a progress length. A video may include visual content having the progress length. A video may include visual content viewable as a function of progress through the progress length of the video. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. The progress length of the video content may correspond to the capture duration for the video. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content). Other progress lengths, time durations, and frame numbers of videos are contemplated.

A video may include visual content of one or more scenes captured by an image capture device during the capture duration. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects). A video may include visual content captured at different moments within the capture duration.

The visual content may have a field of view. A field of view of a video/visual content may refer to a field of view of a scene captured within the video/visual content (e.g., within video frames). A field of view of a video/visual content may refer to the extent of a scene that is captured within the video/visual content. In some implementations, the field of view of a video/visual content may be greater than or equal to 180-degrees. In some implementations, the field of view of a video/visual content may be smaller than or equal to 180-degrees. The field of view of the visual content may be referred to as a source field of view. The field of view of the visual content may have a vertical dimension, a horizontal dimension, a diagonal dimension, and/or other dimensions. For example, referring to FIG. 3, the visual content of the video may have a source field of view with height of h and width of w. Other sizes and shapes/aspect ratios of visual content are contemplated.

The video information may define a video by including information that defines one or more content, qualities, attributes, features, and/or other aspects of the video. For example, video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. For example, the video information may include information that makes up and/or is used to determine pixels of video frames of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The placement component 104 may be configured to obtain viewing window placement information for the video and/or other information. The placement component 104 may obtain viewing window placement information for a video while an image capture device is capturing the video. The placement component 104 may obtain viewing window placement information for a video after the video has been captured and stored in memory (e.g., the electronic storage 13).

The viewing window placement information may define placement of a viewing window for the visual content. The viewing window placement information may define placement of a viewing window for the visual content as the function of progress through the progress length of the video. The viewing window placement information may define placement of a viewing window for the visual content by including information that defines one or more content, qualities, attributes, features, and/or other aspects of the viewing windows for the visual content. For example, the viewing window placement information may define placement of a viewing window for the visual content by including information that specifies, indicates, identifies, and/or is used to determine where and how the viewing window is to be positioned with respect to the visual content. For instance, the viewing window placement information may include information that specifies and/or is used to determine the center location of the viewing window within the source field of view, along with in what direction and by what amount the viewing window should be rotated. The viewing window placement information may include information that specifies and/or is used to determine the size and/or the shape of the viewing window. Other types of viewing window placement information are contemplated.

A viewing window may define extents of the visual content to be included within stabilized visual content. A viewing window may define extents of the visual content to be included within stabilized visual content as the function of progress through the progress length of the video. A viewing window may define which spatial portions of the visual content are to be included within stabilized visual content at different moments within the progress length of the video. inclusion of the extents of the visual content defined by the viewing window within the stabilized visual content may effectuate stabilization of the visual content.

A viewing window may define extents of the visual content to be included within a punchout of the visual content as the function of progress through the progress length. A viewing window may correspond to the entire progress length of the video or for one or more portions (points, moments) of the progress length of the video. The punchout of the visual content may be presented on one or more electronic displays, included in one or more videos, and/or otherwise used for presenting a stabilized view of the visual content. A stabilized view of the visual content may include a horizon-leveled view of the visual content.

A viewing window may have a field of view. The field of view of a viewing window may be referred to as a punchout field of view. The punchout field of view of the viewing window may have a vertical dimension, a horizontal dimension, a diagonal dimension, and/or other dimensions. For example, referring to FIG. 3, a viewing window may have a punchout field of view with a diagonal of d. Other sizes and shapes/aspect ratios of viewing window are contemplated. The shape/aspect ratio of viewing window may be same or different from the shape/aspect ratio of visual content.

The placement of the viewing window may include how the viewing window is placed/oriented with respect to the visual content. The placement of the viewing window may include how the punchout field of view is placed/oriented with respect to the source field of view. The viewing window placement information may define one or more of rotation, location, shape, size, and/or other characteristics of the viewing window. For example, the viewing window placement information may define (e.g., specify, indicate, identify, used to determine) where the center of the punchout field of view of the viewing window is located within the source field of view of the visual content and how (in what direction and by what amount) the punchout field of view is rotated. The center of the punchout field of view may be defined by a pitch angle and a yaw angle and the rotation of the punchout field of view may be defined by a roll angle. The viewing window placement information may define the size and/or the shape of the viewing window.

The placement of a viewing window for the visual content may be defined as the function of progress through the progress length of the video. Separate placement of the viewing window may be defined for different moments within the progress length of the video. The placement of a viewing window for the visual content may be determined based on user input, analysis of visual content capture, analysis of visual content, and/or other information. For example, where and how the viewing window should be located for different moments within the video may be controlled by a user. Where and how the viewing window should be located for different moments within the video may be determined based on how the video was captured (e.g., positions/motions experienced by the image capture device during capture) and/or analysis of the video to stabilize and/or horizon level the video. For example, the placement of the viewing window for the visual content may be determined so that output of the spatial portions of the visual content within the viewing window results in the output visual content being more stabilized and/or more horizon leveled than the original visual content. The placement of the viewing window for the visual content may be determined so that output of the spatial portions of the visual content within the viewing window results in the output visual content being stabilized and/or horizon leveled.

The constraint model component 106 may be configured to obtain constraint model space partition tree information for the video and/or other information. The constraint model component 106 may obtain constraint model space partition tree information for the video before an image capture device starts capturing the video. The constraint model component 106 may obtain constraint model space partition tree information for the video while the image capture device is capturing the video. The constraint model component 106 may obtain constraint model space partition tree information for the video after the video has been captured and stored in memory (e.g., the electronic storage 13).

The constraint model space partition tree information for a video may define a constraint model space partition tree for the video. The constraint model space partition tree information may define a constraint model space partition tree for the video by including information that defines one or more content, qualities, attributes, features, and/or other aspects of the constraint model space partition tree for the video. For example, the constraint model space partition tree information may define a constraint model space partition tree for the video by including information that defines one or more content, qualities, attributes, features, and/or other aspects of branches, leaves, nodes, and/or a constraint model for the video. For example, the constraint model space partition tree information may include information that makes up and/or is used to determine the branches, leaves, nodes, and/or other characteristics that divide a constraint model for the video. Other types of constraint model space partition tree information are contemplated.

A constraint model space partition tree may be a hierarchical polygonal data structure. A constraint model space partition tree may refer to a data structure in which nodes recursively divides a space into two. A constraint model space partition tree may include branches that split a constraint model for the video. A constraint model for a video may include a representation of feasible viewing window placement in which entirety of the punchout field of view of the viewing window is contained within the source field of view of the visual content. The dimensions of the representation of feasible viewing window placement may depend on the number of stabilization parameters for the video. The representation of feasible viewing window placement of the constraint model may be generated based on multiple stabilization parameters for the video and/or other information. The multiple stabilization parameters for the video may include rotations about multiple axes, the size and/or the shape of the viewing window, a reduction in usable extent of the source field of view of the visual content for the placement of the viewing window, and/or other stabilization parameters.

The representation of feasible viewing window placement may be generated by checking whether different placements of the viewing window results in the viewing window being placed wholly inside the source field of view or one or more parts of the viewing window being placed outside the source field of view. Check on whether viewing window is wholly within the source field of view/one or more parts of the viewing window is outside the source field of view may be made by checking whether certain points/locations along the edge of the viewing window is within or outside the source field of view. That is, rather than checking whether every part of the viewing window is inside or outside the source field of view, a certain number of points/locations along the periphery of the viewing window may be checked to determine whether those points/locations are within or outside the source field of view. When all of those points/locations are determined to be within the source field of view, the particular placement of the viewing window may be determined to include the entirety of the viewing window within the source field of view. When one or more of those points/locations are determined to be outside the source field of view, the particular placement of the viewing window may be determined to not include the entirety of the viewing window within the source field of view.

The representation of feasible viewing window placement may be generated using a cube map with cells that represent different ranges of viewing window placements. The cells may be further subdivided into sub-cells representing individual viewing window placements. Limits of individual sub-cells may be computed to determine limits of viewing window placements, and a plane may be fitted on the limits to generate the representation of feasible viewing window placement.

In some implementations, the branches of the constraint model space partition tree may terminate at leaves of the constraint model space partition tree. An individual leaf of the constraint model space partition tree may define a projection function to move the viewing window outside the source field of view of the visual content to inside the source field of view of the visual content. The individual leaf of the constraint model space partition tree may define a single projection function for a group of neighboring points inside the constraint model for the video. The projection function may include an affine transformation.

In some implementations, the constraint model space partition tree may include a k-D tree, a binary space partitioning tree, and/or other types of space partition tree. In some implementations, the leaves of the constraint model space partition tree may be clustered to simplify (prune) the constraint model space partition tree. For example, leaves of the constraint model space partition tree may be clustered together to form a larger leaf if the leaves satisfy CM(x, leaf)=A(leaf)x+B(leaf). For a k-D tree having the maximum depth of d, a query x may require 1 d test to arrive at the desired leaf and compute the projection with A(leaf) x+B (leaf).

For a binary tree, a query x may start at the root node and evaluate whether the current node n is at the deepest depth. If yes, then A(node)x+B(node) may be returned for projection of the viewing window placement. If not, then w·x−u may be completed, where w·x<v is the separation at every level with w being a vector and v being a scalar. If the computed value is positive, then the positive subregion of the node n may be evaluated. If the computed value is negative, then the negative subregion of the node n may be evaluated. The split between the positive and negative regions may be replaced with result=α×evaluate(n+)+(1−α)×evaluate(n−) using α=tan h(T*(w·x−u)). If T is small value (smaller than a threshold value), then the results may be blended together. If T is a large value (larger than a threshold value), then the results may form a hard split between the two. Maximum depth of the constraint model space partition tree may be specified, and the constraint model space partition tree may be initialized with random parameters. The constraint model space partition tree may be optimized for a batch of points. The T value may start small and become bigger throughout the training process, such that in the beginning everything is smooth and differentiable, while at the end, the binary tree behaves like a true tree with a hard split between positive and negative subregions.

The modified placement component 108 may be configured to, responsive to the placement of the viewing window outside the source field of view of the visual content, determine modified placement of the viewing window. Determining modified placement of the viewing window may include ascertaining, calculating, establishing, finding, identifying, and/or otherwise determining the modified placement of the viewing window. The modified placement of the viewing window may include one or more changes from the placement of the viewing window. The modified placement of the viewing window may include one or more changes in the placement of the viewing window.

The placement of the viewing window being outside the source field of view of the visual content may result in the placement of the viewing window failing to satisfy the constraint model for the video. A particular placement of the viewing window failing to satisfy the constraint model may include the particular placement of the viewing window being located outside the representation of feasible viewing window placement. A particular placement of the viewing window failing to satisfy the constraint model may include the particular placement of the viewing window not falling on the surface of the representation of feasible viewing window placement or being within the representation of feasible viewing window placement.

The modified placement of the viewing window may be determined based on the constraint model space partition tree for the video and/or other information. The modified placement may be determined based on the constraint model space partition tree for the video to be located on the surface of the representation of feasible viewing window placement. The modified placement may be determined based on the constraint model space partition tree for the video to be located at the closest point on the surface of the representation of feasible viewing window placement. The modified placement of the viewing window may be determined for the particular moment/point within the progress length to include a modified placement for the original placement of the viewing window.

The constraint model space partition tree may be traversed based on the current placement of the viewing window to determine the modified placement of the viewing window. The current placement of the viewing window may be represented by a vector (having dimensions corresponding to the number of stabilization parameters). At splits along the constraint model space partition tree, a check may be made as to on which side of the split a left corresponding to the current placement of the viewing window/vector is located. This same check may be repeated at various splits to arrive at the corresponding leaf. The projection function of the leaf may be used to modify the viewing window placement. For example, the matrices A and B of the leaf reached through the query on the constraint model space partition tree may be stored and/or used (e.g., multiply x in the query by the A matrix and add the B matrix) to project the viewing window into a modified placement that places the viewing window entirely within the source field of view of the visual content.

The generation component 110 may be configured to generate the stabilized visual content. Stabilized visual content may refer to visual content depicting a stable/more stable scene than the original visual content. Stabilized visual content may refer to visual content including depiction of a scene that stabilized with respect to motion. Stabilized visual content may refer to visual content that depicts a scene which appears to have been captured by an image capture device that experience less motion than the image capture device that captured the visual content.

In some implementations, the stabilized visual content may include horizon-leveled visual content. Horizon-leveled visual content may refer to visual content depicting a leveled scene. Horizon-leveled visual content may refer to visual content including depiction of a scene that is leveled with respect to ground, sea, earth, and/or the horizon. A horizon may refer to a line that appears to separate the visual content into two portions. A horizon may extend across the majority or entirety of the visual content. For example, a horizon may refer to a line where the earth (e.g., ground, sea) appears to meet the sky. Horizon-leveled visual content may refer to visual content that depicts a scene which appears to have been captured by an upright image capture device (non-tilted image capture device).

The stabilized visual content may be generated based on viewing window. The stabilized visual content may be generated based on the original placement of the viewing window, the modified placement of the viewing window, and/or other information. The stabilized visual content may include a punchout of the extents of the visual content defined by the viewing window. Inclusion of the extents of the visual content defined by the viewing window within the stabilized visual content may effectuate stabilization of the visual content. Inclusion of the extents of the visual content defined by the viewing window within the stabilized visual content may effectuate stabilization of the visual content via selective cropping.

The spatial portions of the visual content that are cropped for stabilization may depend on the original placement or the modified placement of the viewing window and/or other information. Stabilization of the visual content may include using smaller portions/extents of the visual content within the viewing window to provide a punchout view of the visual content that creates a more stable view than when viewing the entirety of the visual content.

In some implementations, the stabilized visual content may be generated as images/video frames including extents of the visual content defined by the viewing window. The stabilized visual content may be generated as outputs of portions of the visual content captured by the image capture device, with the output portions including extents of the visual content defined by the viewing window.

In some implementations, the stabilized visual content may be generated as an encoded version/copy of the stabilized visual content (e.g., encoded video file) and/or a director track that defines the extents of the visual content to be used during playback to provide a stabilized view of the visual content. For example, the stabilized visual content may be generated as video frames in a video file, and the video file may be opened in a video player for presentation of the stabilized visual content. The stabilized visual content may be generated as instructions to render the visual content for presentation. The instructions (e.g., director track) may define which spatial portions of the visual content (images, video frames) should be included within the presentation of the visual content. The instructions may define which spatial portions of the visual content should be included during playback to provide a stabilized view of the visual content. The instructions may include information on the placement of the punchout of images/video frames to be used to as a function progress through the progress length of the visual content to provide a stabilized view of the images/video frames. A video player may use the instructions to retrieve the relevant spatial portions of the images/video frames when the visual content is opened and/or is to be presented.

The generation component 110 may be configured to store the stabilized visual content and/or other information in one or more storage media. For example, the stabilized visual content (e.g., video file, director track) may be stored in the electronic storage 13, remote storage locations (storage media located at/accessible through a server), and/or other locations. Other storage locations for and storage of the stabilized visual content are contemplated.

In some implementations, the processor 11 may represent multiple processors, and at least one of the processors may be a remote processor located remotely from the image capture device. One or more of the functionalities of the computer program components may be performed by the image capture device and/or by a remote processor. For example, modification of viewing window placement and/or stabilized visual content generation may be performed by a remote processor (of a mobile device, of a desktop device, of a server) during and/or post capture of the visual content by the image capture device. As another example, stabilized visual content generation may be performed by the image capture device during capture of the visual content to provide the stabilized visual content during capture of the visual content (e.g., as preview of visual content being captured presented on an electronic display of the image capture device).

In some implementations, the visual content may not be stabilized in/near real time. For example, the image capture device may not have sufficient resources to apply the stabilization technique described herein in real-time and/or may be devoting its resources to other tasks. The stabilization of the visual content may be performed by the image capture device once sufficient resources become available. The stabilization of the visual content may be performed by a remote processor. For example, the remote processor may be one or more processors of a remote computing device (e.g., mobile device, desktop, server), and the remote processor may receive video information captured/generated by the image capture device. The remote computing device (software running on the remote computing device) may apply the stabilization technique described herein post capture of the visual content by the image capture device. The post-capture stabilization of the visual content may be performed by the remote processor responsive to reception of the video information, responsive to user/system command to stabilize the visual content, responsive to the visual content being opened for playback, and/or responsive to other conditions.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
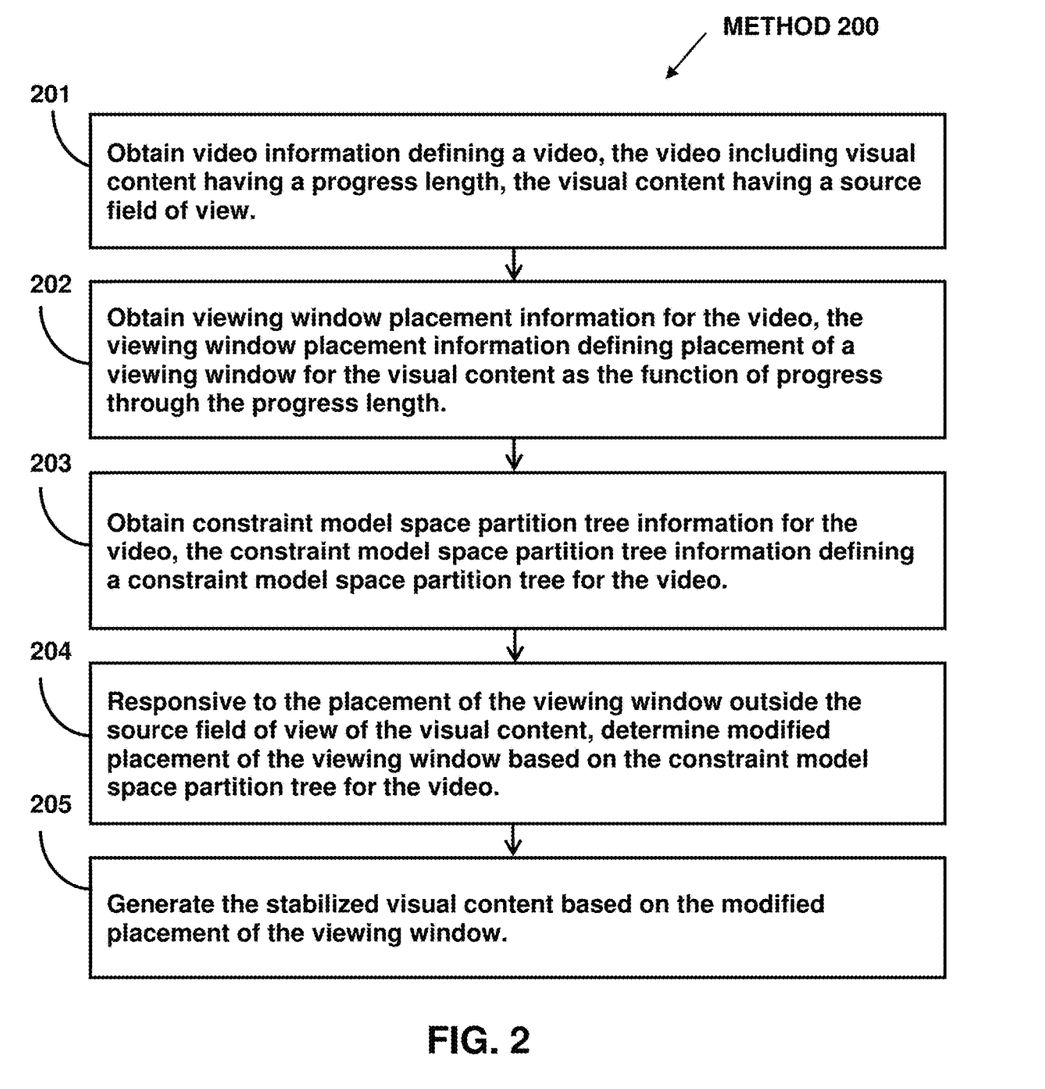
FIG. 2 illustrates an example method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include visual content having a progress length. The visual content may have a source field of view. In some implementations, operation 201 may be performed by a processor component the same as or similar to the video component 102 (Shown in FIG. 1 and described herein).

At operation 202, viewing window placement information may be obtained. The viewing window placement information for the video may define placement of a viewing window for the visual content as the function of progress through the progress length. The viewing window may define extents of the visual content to be included within stabilized visual content as the function of progress through the progress length. The viewing window may have a punchout field of view. In some implementations, operation 202 may be performed by a processor component the same as or similar to the placement component 104 (Shown in FIG. 1 and described herein).

At operation 203, constraint model space partition tree information may be obtained. The constraint model space partition tree information for the video may define a constraint model space partition tree for the video. The constraint model space partition tree may include branches that split a constraint model for the video. The constraint model for the video may include a representation of feasible viewing window placement in which entirety of the punchout field of view of the viewing window is contained within the source field of view of the visual content. In some implementations, operation 203 may be performed by a processor component the same as or similar to the constraint model component 106 (Shown in FIG. 1 and described herein).

At operation 204, responsive to the placement of the viewing window outside the source field of view of the visual content, modified placement of the viewing window may be determined based on the constraint model space partition tree for the video and/or other information. In some implementations, operation 204 may be performed by a processor component the same as or similar to the modified placement component 108 (Shown in FIG. 1 and described herein).

At operation 205, the stabilized visual content may be generated based on the modified placement of the viewing window and/or other information. The stabilized visual content may include a punchout of the extents of the visual content defined by the viewing window. Inclusion of the extents of the visual content defined by the viewing window within the stabilized visual content may effectuate stabilization of the visual content. In some implementations, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising:
one or more physical processors configured by machine-readable instructions to:
obtain video information defining a video, the video including visual content having a progress length, the visual content having a source field of view;
obtain viewing window placement information for the video, the viewing window placement information defining placement of a viewing window for the visual content as the function of progress through the progress length, the viewing window defining extents of the visual content to be included within stabilized visual content as the function of progress through the progress length, the viewing window having a punchout field of view;
obtain constraint model space partition tree information for the video, the constraint model space partition tree information defining a constraint model space partition tree for the video, the constraint model space partition tree including branches that split a constraint model for the video, the constraint model for the video including a representation of feasible viewing window placement in which entirety of the punchout field of view of the viewing window is contained within the source field of view of the visual content, wherein the branches of the constraint model space partition tree terminate at leaves of the constraint model space partition tree, an individual leaf of the constraint model space partition tree defining a single projection function for a group of neighboring points inside the constraint model for the video to move the viewing window outside the source field of view of the visual content to inside the source field of view of the visual content;
responsive to the placement of the viewing window outside the source field of view of the visual content, determine modified placement of the viewing window based on the constraint model space partition tree for the video; and
generate the stabilized visual content based on the modified placement of the viewing window, the stabilized visual content including a punchout of the extents of the visual content defined by the viewing window, wherein inclusion of the extents of the visual content defined by the viewing window within the stabilized visual content effectuates stabilization of the visual content.

2. The system of claim 1, wherein the representation of feasible viewing window placement of the constraint model is generated based on multiple stabilization parameters for the video, the multiple stabilization parameters for the video including rotations about multiple axes, a size or a shape of the viewing window, and a reduction in usable extent of the source field of view of the visual content for the placement of the viewing window.

3. A system for stabilizing videos, the system comprising:
one or more physical processors configured by machine-readable instructions to:
obtain video information defining a video, the video including visual content having a progress length, the visual content having a source field of view;
obtain viewing window placement information for the video, the viewing window placement information defining placement of a viewing window for the visual content as the function of progress through the progress length, the viewing window defining extents of the visual content to be included within stabilized visual content as the function of progress through the progress length, the viewing window having a punchout field of view;

obtain constraint model space partition tree information for the video, the constraint model space partition tree information defining a constraint model space partition tree for the video, the constraint model space partition tree including branches that split a constraint model for the video, the constraint model for the video including a representation of feasible viewing window placement in which entirety of the punchout field of view of the viewing window is contained within the source field of view of the visual content;

responsive to the placement of the viewing window outside the source field of view of the visual content, determine modified placement of the viewing window based on the constraint model space partition tree for the video; and generate the stabilized visual content based on the modified placement of the viewing window, the stabilized visual content including a punchout of the extents of the visual content defined by the viewing window, wherein inclusion of the extents of the visual content defined by the viewing window within the stabilized visual content effectuates stabilization of the visual content.

4. The system of claim 3, wherein the branches of the constraint model space partition tree terminate at leaves of the constraint model space partition tree, an individual leaf of the constraint model space partition tree defining a projection function to move the viewing window outside the source field of view of the visual content to inside the source field of view of the visual content.

5. The system of claim 4, wherein the individual leaf of the constraint model space partition tree defines a single projection function for a group of neighboring points inside the constraint model for the video.

6. The system of claim 4, wherein the projection function includes an affine transformation.

7. The system of claim 3, wherein the representation of feasible viewing window placement of the constraint model is generated based on multiple stabilization parameters for the video.

8. The system of claim 7, wherein the multiple stabilization parameters for the video includes rotations about multiple axes.

9. The system of claim 8, wherein the multiple stabilization parameters for the video further includes a size or a shape of the viewing window.

10. The system of claim 8, wherein the multiple stabilization parameters for the video further includes a reduction in usable extent of the source field of view of the visual content for the placement of the viewing window.

11. The system of claim 3, wherein the constraint model space partition tree includes a k-D tree or a binary space partitioning tree.

12. A method for stabilizing videos, the method performed by a computing system including one or more processors, the method comprising:

obtaining, by the computing system, video information defining a video, the video including visual content having a progress length, the visual content having a source field of view;

obtaining, by the computing system, viewing window placement information for the video, the viewing window placement information defining placement of a viewing window for the visual content as the function of progress through the progress length, the viewing window defining extents of the visual content to be included within stabilized visual content as the function of progress through the progress length, the viewing window having a punchout field of view;

obtaining, by the computing system, constraint model space partition tree information for the video, the constraint model space partition tree information defining a constraint model space partition tree for the video, the constraint model space partition tree including branches that split a constraint model for the video, the constraint model for the video including a representation of feasible viewing window placement in which entirety of the punchout field of view of the viewing window is contained within the source field of view of the visual content;

responsive to the placement of the viewing window outside the source field of view of the visual content, determining, by the computing system, modified placement of the viewing window based on the constraint model space partition tree for the video; and generating, by the computing system, the stabilized visual content based on the modified placement of the viewing window, the stabilized visual content including a punchout of the extents of the visual content defined by the viewing window, wherein inclusion of the extents of the visual content defined by the viewing window within the stabilized visual content effectuates stabilization of the visual content.

13. The method of claim 12, wherein the branches of the constraint model space partition tree terminate at leaves of the constraint model space partition tree, an individual leaf of the constraint model space partition tree defining a projection function to move the viewing window outside the source field of view of the visual content to inside the source field of view of the visual content.

14. The method of claim 13, wherein the individual leaf of the constraint model space partition tree defines a single projection function for a group of neighboring points inside the constraint model for the video.

15. The method of claim 13, wherein the projection function includes an affine transformation.

16. The method of claim 12, wherein the representation of feasible viewing window placement of the constraint model is generated based on multiple stabilization parameters for the video.

17. The method of claim 16, wherein the multiple stabilization parameters for the video includes rotations about multiple axes.

18. The method of claim 17, wherein the multiple stabilization parameters for the video further includes a size or a shape of the viewing window.

19. The method of claim 17, wherein the multiple stabilization parameters for the video further includes a reduction in usable extent of the source field of view of the visual content for the placement of the viewing window.

20. The method of claim 12, wherein the constraint model space partition tree includes a k-D tree or a binary space partitioning tree.

\* \* \* \* \*